US006929415B2

(12) United States Patent
Wilken

(10) Patent No.: US 6,929,415 B2
(45) Date of Patent: Aug. 16, 2005

(54) WIRE MARKER LABEL MEDIA

(75) Inventor: Kevin L. Wilken, Wauwatosa, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 10/639,549

(22) Filed: Aug. 12, 2003

(65) Prior Publication Data

US 2005/0036818 A1 Feb. 17, 2005

(51) Int. Cl.[7] .............................. F16L 11/06; F16L 11/04

(52) U.S. Cl. ......................... 400/613; 156/270; 156/196; 428/34.9; 428/98

(58) Field of Search .................................. 156/270, 196; 428/34.9, 98; 101/41, 42, 43, 44; 400/613, 88, 621

(56) References Cited

U.S. PATENT DOCUMENTS

| | | | | |
|---|---|---|---|---|
| 3,650,059 A | * | 3/1972 | Johnson | 40/316 |
| 4,234,090 A | | 11/1980 | Barbieri et al. | |
| 4,239,399 A | | 12/1980 | Johnstun | |
| 4,361,230 A | | 11/1982 | Downing et al. | |
| 4,363,401 A | | 12/1982 | Savagian | |
| 4,442,939 A | | 4/1984 | Downing | |
| 4,582,984 A | | 4/1986 | Peterpaul et al. | |
| 4,586,610 A | | 5/1986 | Gandolfo | |
| 4,636,271 A | | 1/1987 | Gandolfo | |
| 4,761,086 A | | 8/1988 | Peterpaul | |
| 4,865,895 A | | 9/1989 | Vlamings et al. | |
| 5,078,523 A | | 1/1992 | McGourty et al. | |
| 5,766,705 A | | 6/1998 | O'Brien et al. | |
| 5,833,379 A | | 11/1998 | Kano | |
| 5,862,751 A | | 1/1999 | Triantopoulos et al. | |
| 6,113,293 A | | 9/2000 | Schanke et al. | |
| 6,211,117 B1 | | 4/2001 | Haggerty et al. | |
| 6,266,075 B1 | | 7/2001 | Feitel et al. | |
| 6,277,456 B1 | | 8/2001 | Buldrin et al. | |

FOREIGN PATENT DOCUMENTS

| | | | | |
|---|---|---|---|---|
| CA | 2014632 A | * | 8/1991 | G09F/3/02 |
| FR | 2588875 A1 | * | 4/1987 | C09J/5/00 |
| JP | 11105352 A | * | 4/1999 | B41J/3/36 |
| JP | 2001253600 A | * | 9/2001 | B65H/16/02 |

OTHER PUBLICATIONS

Machine translation of JP 11–105352 to Casio Computer Co. from Japanese Patent Office website.*

* cited by examiner

*Primary Examiner*—Daniel J. Colilla
(74) *Attorney, Agent, or Firm*—Quarles & Brady LLP

(57) ABSTRACT

A label media for use in a label media printer forms dynamically sized label markers. The label media includes a continuous tube affixed to a length of a carrier web. Indicia is printed on the tube which is then cut to a desired length that accommodates the indicia printed thereon to dynamically form the wire marker.

14 Claims, 6 Drawing Sheets

WIRE MARKER LABEL MEDIA

CROSS REFERENCES TO RELATED APPLICATIONS

Not Applicable

STATEMENT REGARDING FEDERALLY SPONSORED RESEARCH

Not Applicable

TECHNICAL FIELD

The present invention relates to label media, and more particularly to label media forming tubular wire markers.

DESCRIPTION OF THE BACKGROUND ART

There are a number of U.S. patents that disclose electronic apparatus for printing indicia on labels for use as wire markers, some of these are restricted to hand held units and others that disclose tabletop units. Hand held label printers, such as disclosed in U.S. Pat. No. 6,113,293, and tabletop printers, such as disclosed in U.S. Pat. Nos. 6,266,075 and 5,078,523, include the same general combination of elements, a print head, means for feeding label media to be printed past the print head, a microprocessor, a read only memory programmed with appropriate instructions to operate the microprocessor, a random access memory, a keyboard with letter, number, and function keys for the entry of alphanumeric information and instructions concerning the indicia to be printed, and a visual display such as a light emitting diode (LED) or liquid crystal display (LCD) unit to assist the operator in using the printer. In a hand held printer, these components may all be enclosed in a single housing.

A particular type of print head employs thermal transfer printing technology. Thermal transfer printing uses a heat generating print head to transfer a pigment, such as wax, carbon black, or the like, from a thermal transfer ribbon to a label media. By using digital technology, characters are formed by energizing a sequence of pixels on the print head which in turn melts the wax or other pigment on the ink ribbon transferring the image to the label media.

Known wire marker label media comprises a series of identical fixed length labels that are attached to a carrier strip. The carrier strip is fed through the printer and legends, alphanumeric characters, and other indicia, are printed on the labels. The wire marker labels are then removed from the carrier web and slipped on, or wrapped around, the wire needing identification. As there are many types of label applications, there are many combinations of labels and carrier strips that provide labels of varying sizes, colors and formats.

In known wire marker labels, the longest string of indicia that must be printed on the wire marker label determines the shortest wire marker that can be used. In addition, the carrier strip width is typically determined by length of the wire marker. This results in a significant waste of label media when the longest string occurs infrequently, and requires a cartridge and printer to handle different carrier strip widths. Therefore, a need exists for label media that can produce wire markers that can be dynamically sized to accommodate variable length strings of indicia.

SUMMARY OF THE INVENTION

The present invention provides a label media for use in a label media printer to form dynamically sized label markers.

The wire marker media is dynamically sized to accommodate variable length strings of indicia by cutting the label media after indicia has been printed thereon. The label media includes a carrier web having a length. An adhesive is disposed on one side of the carrier web. A continuous tube is disposed along the length of the carrier web and retained thereto by the adhesive.

A general objective of the present invention is to provide a label media which can dynamically produce any length wire marker. This objective is accomplished by releasably adhering a tube along the length of a carrier web. The label media can be cut to a desired length after indicia is printed thereon to dynamically produce the wire marker.

Another objective of the present invention is to accurately guide a continuous tube through a printer. This objective is accomplished by adhering the continuous tube to a carrier web that does not have the tolerance variations typical of a tube.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
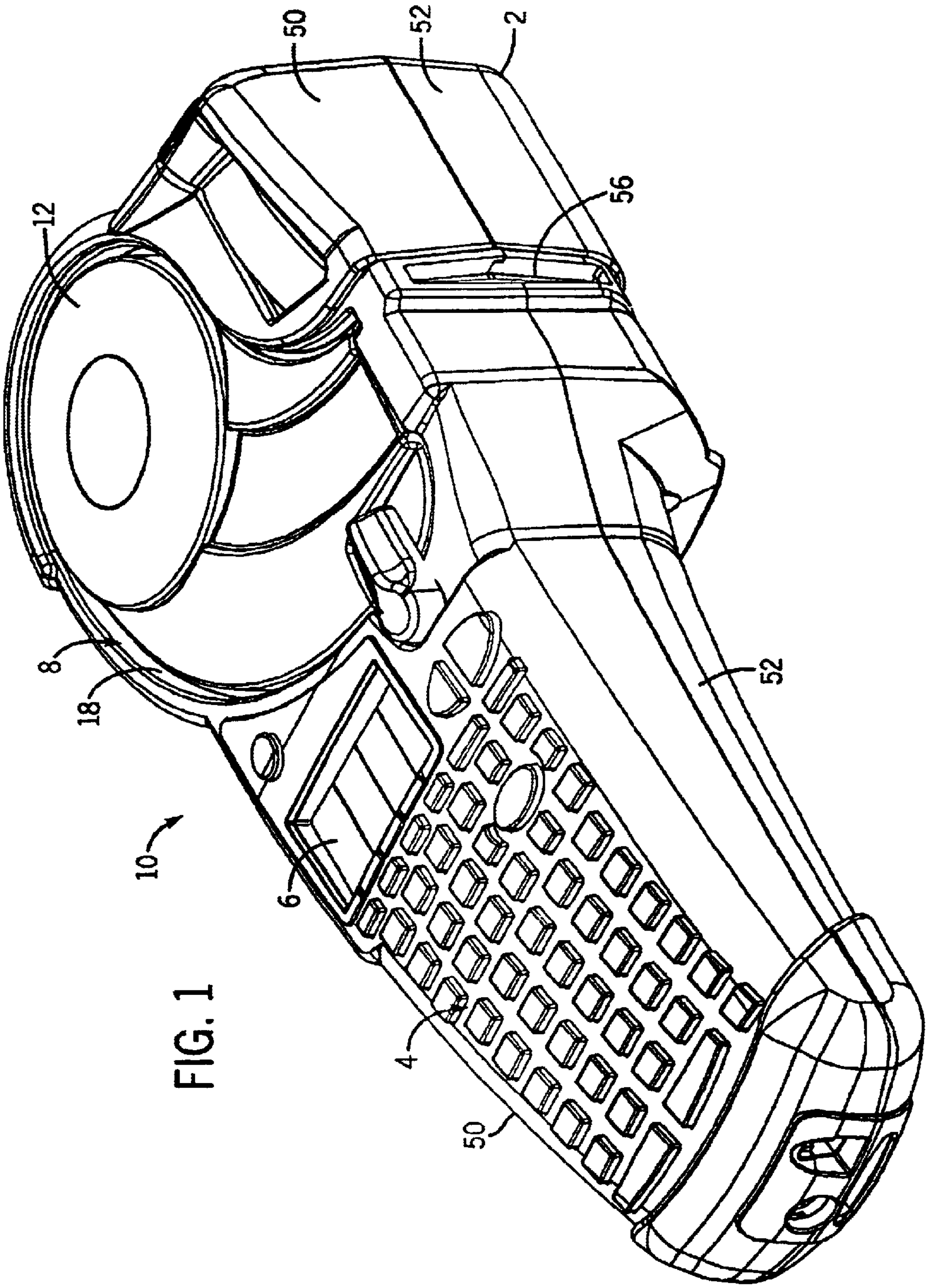
FIG. 1 is a perspective view of a hand held label printer incorporating the present invention.
Figure 2:
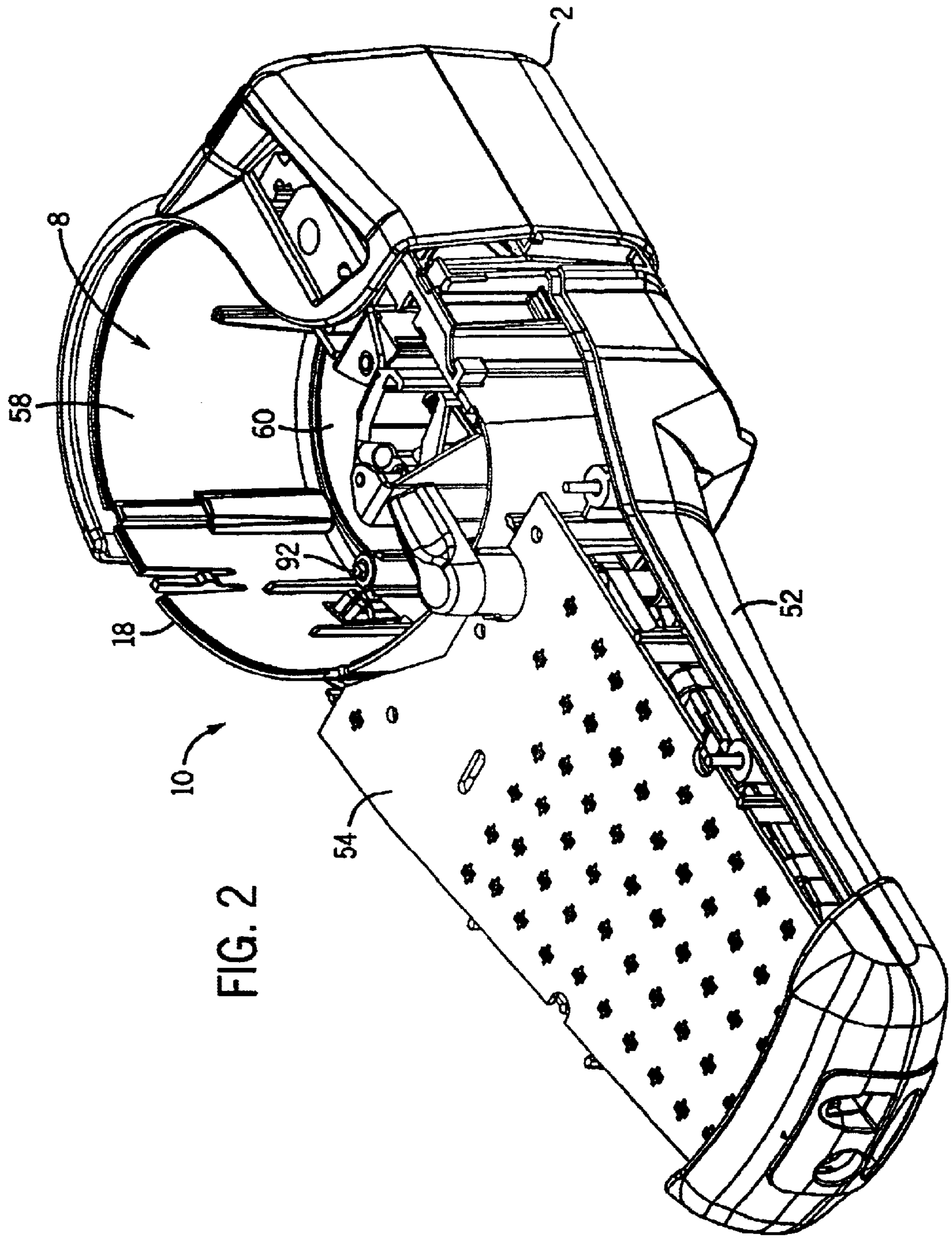
FIG. 2 is a perspective view of the printer of FIG. 1 with the cartridge and top portion, keyboard, and display removed.
Figure 3:
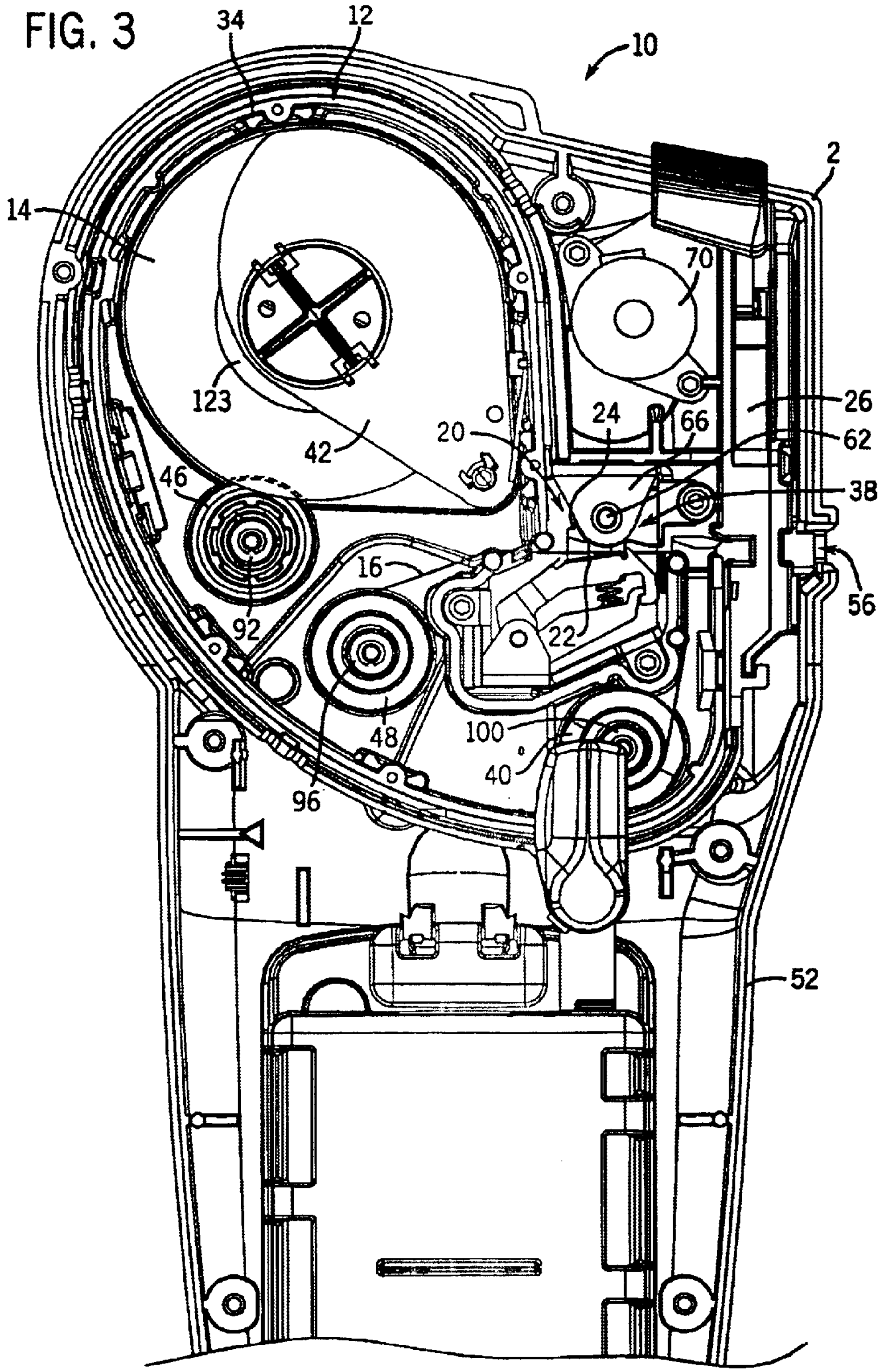
FIG. 3 is a top view of the cartridge of FIG. 1 received in the cartridge receptacle with the top wall of the cartridge removed.

Referring particularly to FIGS. 1–3, a hand held thermal printer 10 employing a preferred embodiment of the present invention includes a molded plastic housing 2 that supports a keyboard 4 on its front surface and a display 6 positioned above the keyboard 4. An opening 8 formed in the housing 2 above the display 6 receives a cartridge 12 containing label media 14 and an ink ribbon 16. The cartridge 12 is inserted through the opening 8 into a cartridge receptacle 18 housed in the printer housing 2.

The label media 14 and ink ribbon 16 from the cartridge 12 are threaded through a printer mechanism assembly 20. The printer mechanism assembly 20 includes a print head 22 and a platen roller 24 for printing indicia on the label media 14. The label media 14 is dispensed from the cartridge 12, and urged along a web path by the platen roller 24 as the label media 14 is consumed by the printer 10. The printed portion of the label media 14 passes through a cutter mechanism 26 which cuts the label media 14 to dynamically form a wire marker having a desired length appropriate for the indicia printed thereon.

Figure 4:
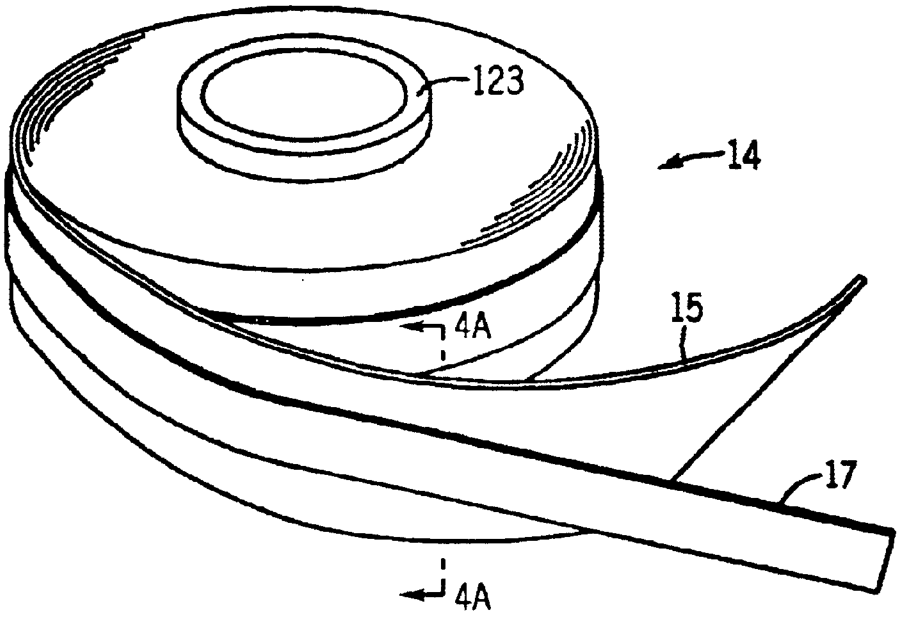
FIG. 4 is a perspective view of the label media disposed in the label media cartridge of FIG. 1.
Figure 4A:
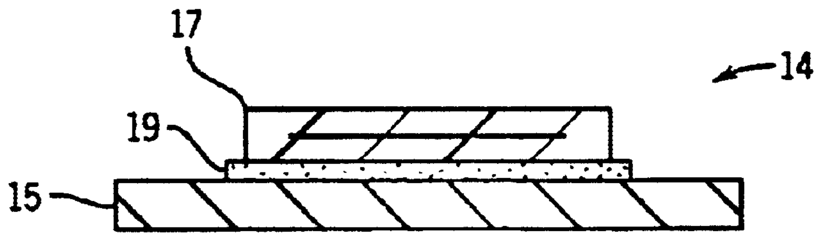
FIG. 4*a* is a cross sectional view of the label media of FIG. 4.
Figure 5:
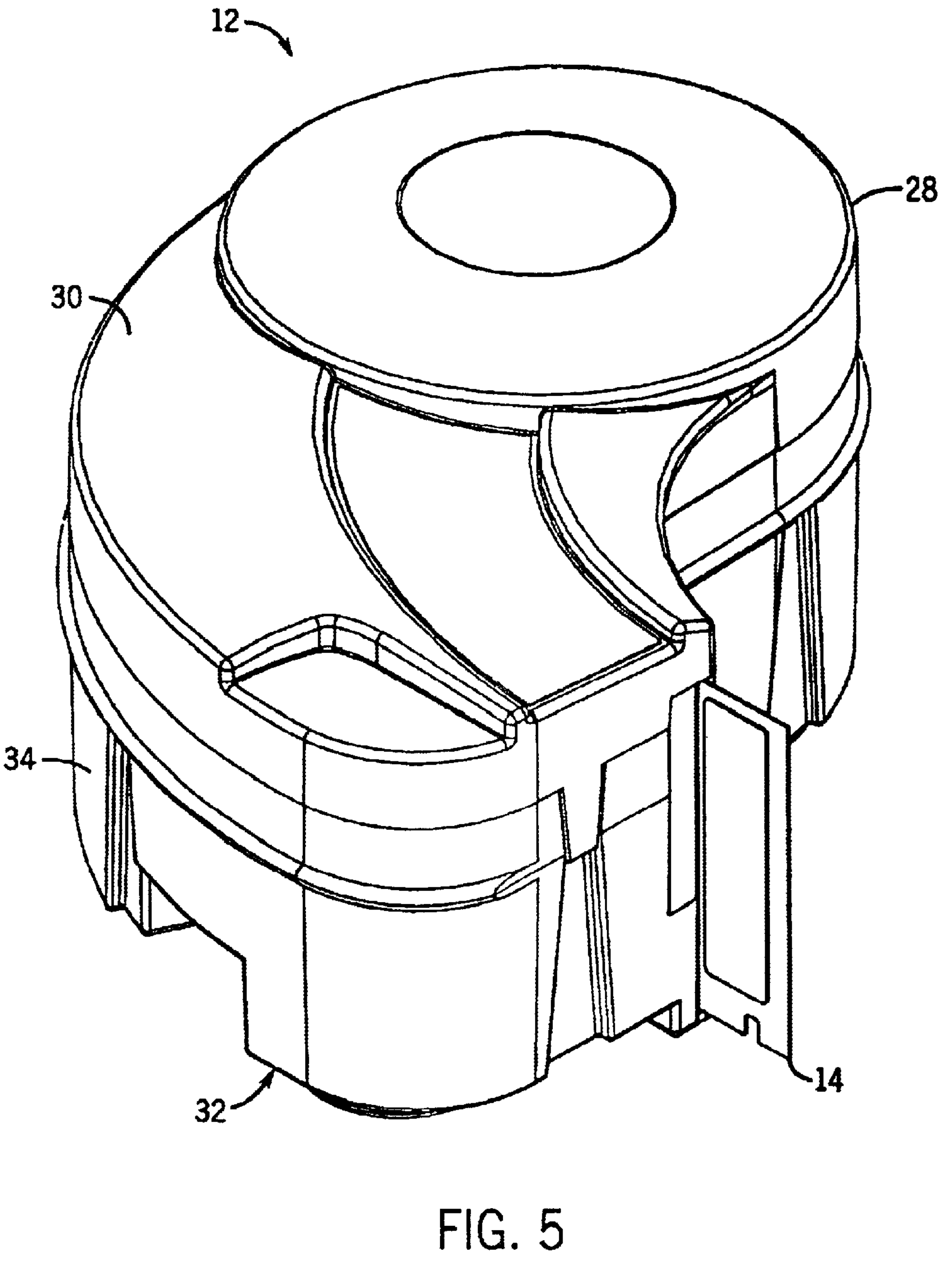
FIG. 5 is a top perspective view of the cartridge of FIG. 1.
Figure 6:
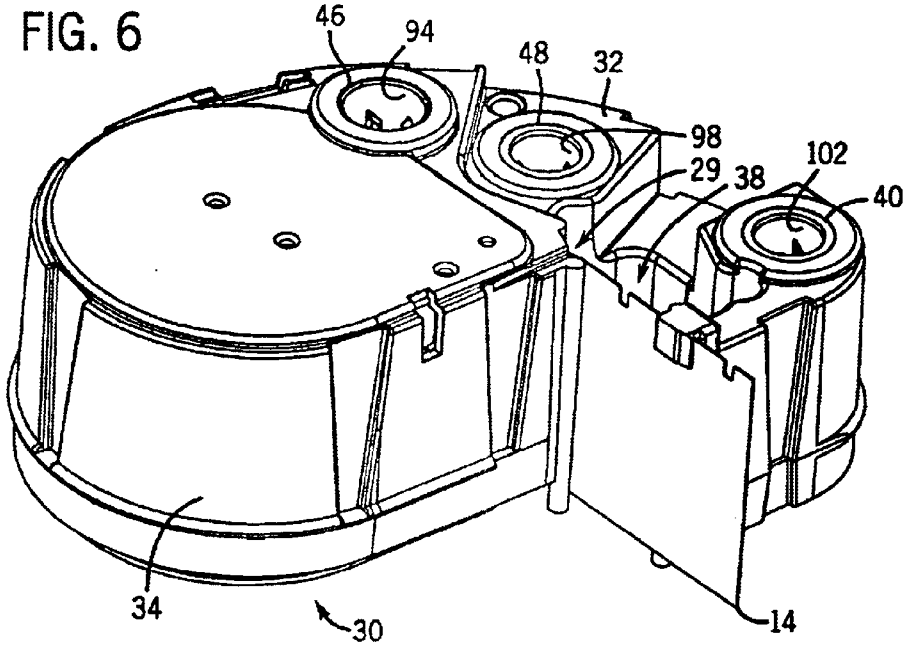
FIG. 6 is a bottom perspective view of the cartridge of FIG. 1.
Figure 7:
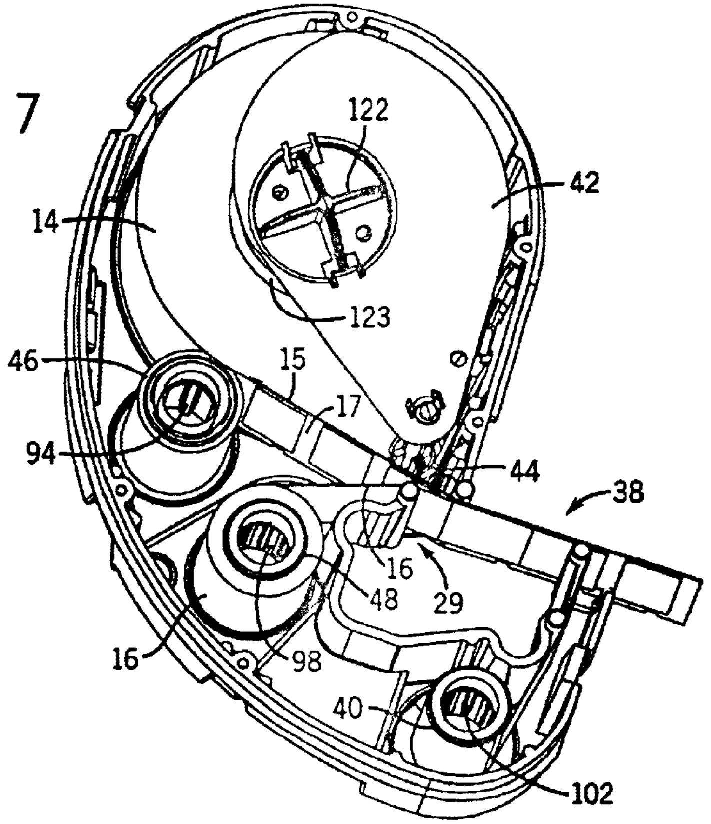
FIG. 7 is a top perspective view of the cartridge of FIG. 3 with the cover removed.

As shown in FIGS. 4 and 4*a*, the label media 14 includes a carrier web 15 which supports a continuous tube 17 along the carrier web length. The size, width, color, and type of carrier web and tube material varies depending upon the particular print application. Preferably, the tube 17 is releasably fixed to the carrier web 15 by an adhesive 19. Advantageously, the novel label media 14 can be economically manufactured using methods known in the art of forming laminate materials. In the embodiment disclosed herein, the label media 14 is wound onto a core 123 in the form of a roll. Although a core is disclosed, the label media can be formed into a roll without the core without departing from the scope of the invention.

The carrier web 15 accurately guides the tube 17 through the printer 10 along the web path. In a preferred embodiment, the carrier web 15 is a paper liner. Although a carrier web formed from paper is preferred, other materials, such as plastic, can be used without departing from the scope of the invention. Advantageously, the physical dimensions of the carrier web 15 can be controlled to more accurately guide the tube 17 through the printer 10 (shown in FIG. 1) compared to a continuous, flattened tube having normal physical dimension variations. Moreover, the length of the tube 17 is independent of the width of the carrier web 15 which allows the use of one cartridge design for any length wire marker and all different tube diameters.

The adhesive 19 releasably secures the tube 17 to the carrier web 15, and is, preferably, a transfer adhesive, such as double coated tape No. 9553SL available from 3M Corporation, Minneapolis, Minn. The transfer adhesive is applied to one side of the carrier web 15, and has more affinity to the carrier web 15 than the tube 17 which allows the tube 17 to be easily separated from the carrier web 15 once indicia has been printed on the tube 17 by the printer 10. In other words, the preferred adhesive 19 aggressively adheres to the carrier web 15 and releasably adheres to the tube 17. The term "adhesive" used herein refers to one or more layers of adhesive material with or without intermediary films of a nonadhesive material. An example of an adhesive having more than one layer of adhesive material separated by a nonadhesive film is the 3M double coated tape disclosed above.

The continuous tube 17 is, preferably, a flattened heat shrink tube, such as a tube formed from a polyolefin. The tube 17 is releasably secured to the carrier web 15 by the adhesive 19 along the length of the carrier web 15. Of course, the tube 17 secured along the length of the carrier web 15 can include leading and/or trailing ends of the carrier web 15 that is devoid of the tube 17. Heat shrink tubes shrink upon exposure to high temperatures, such as between 85° C. and 190° C. Although a heat shrink tube is preferred, other tubes can be used, such as nonshrinking tubes formed from polyvinyl chloride (PVC), polyester, polyethylene terephthalate (PET), polyvinyl-lidene fluoride, and silicone, shrinking tubes that shrink upon exposure to catalysts other than heat, and the like, without departing from the scope of the invention.

Referring to FIGS. 3 and 5–7, the cartridge 12 includes a cartridge housing 28 having a top wall 30 and a bottom wall 32 joined by a periphery wall 34. The periphery wall 34 defines a label media and ink ribbon container for housing the label media 14 and ink ribbon 16 on spools. The label media 14 and ink ribbon 16 from the cartridge housing 28 pass out of the cartridge housing 28 through an exit slot 29 and into a printing area 38 external to the cartridge housing 28 for engagement with the platen roller 24 and print head 22. The used ink ribbon 16 reenters the cartridge housing 28, and is wound onto an ink ribbon take up spool 40 rotatably mounted in the cartridge housing 28. Drive shafts 92, 96, 100 extending into the cartridge 12 drive an ink ribbon supply spool 48, ink ribbon take up spool 40, and a label media drive roller 46 rotatably mounted in the cartridge housing 28.

In the cartridge disclosed herein, unused ink ribbon 16 is housed in the cartridge housing 28 on the ink ribbon supply spool 48 and, once the ink ribbon 16 travels past the print head 22, it is wound onto the ink ribbon take up spool 40. The ink ribbon supply and take up spools 48, 40 are both rotatably supported in the cartridge housing 28 between the cartridge top and bottom walls 30, 32. The ink ribbon take up and supply spools 40, 48 are selectively rotatably driven by an ink ribbon rewind shaft 100 and ink ribbon unwind shaft 96, respectively, which form part of a drive mechanism to maintain tension in the ink ribbon 16 in the forward and reverse feed directions.

The ink ribbon supply spool 48 is rotatably mounted between the cartridge housing top and bottom walls 30, 32, and has a roll of ink ribbon 16 wound thereon. In the forward feed direction, the ink ribbon 16 unwinds from the ink ribbon supply spool 48 and passes out of the cartridge 12 with the label media 14 through the printing area 38 between the print head 22 and platen roller 24. The print head 22 engages the ink ribbon 16 to transfer ink on the ink ribbon 16 onto the label media 14. Once the ink has been transferred, the ink ribbon 16 reenters the cartridge 12, and is wound onto the ink ribbon take up spool 40 supported between the top and bottom walls 30, 32.

The ink ribbon take up spool 40 is rotatably mounted between the cartridge housing top and bottom walls 30, 32, and, as described above, winds used ink ribbon 16 thereon in the forward feed direction. In the reverse feed direction, the ink ribbon 16 unwinds from the ink ribbon take up spool 40 and passes out of the cartridge 12 through the printing area 38 between the print head 22 and platen roller 24, and is wound onto the ink ribbon supply spool 48.

The label media drive roller 46 is rotatably mounted between the cartridge housing top and bottom walls 30, 32, and engages the label media 14 to define the beginning of the label media path. The beginning of the label media path is defined as the point of contact between the label media drive roller 46 and the label media 14 on the roll supported by the yoke 42. Preferably, the label media drive roller 46 is rubber coated, and in a forward feed direction provides a constant tension in the label media 14 between the label media drive roller 46 and the print head 22 and platen roller 24. In a reverse feed direction, a label media drive shaft 92 forming part of the drive mechanism drives the label media drive roller 46 to maintain tension in the label media 14 between the label media drive roller 46 and platen roller 24 and print head 22.

The label media 14 engaging the label media drive roller 46 is housed in the cartridge housing 28 in the form of a roll rotatably mounted on a label media spool 122. Preferably, the label media spool 122 forms part of the yoke 42 that is pivotally mounted in the cartridge 12. In the embodiment disclosed herein, the yoke 42 pivots so that the label media drive roller 46 engages the roll of label media 14 at a point of tangency to the outside diameter of the roll of label media 14 to provide a constant beginning of the label media path regardless of the roll diameter. Preferably, the yoke 42 is pivotally biased by a torsion spring 44 toward the label media drive roller 46 rotatably mounted between the cartridge housing top and bottom walls 30, 32.

Referring now to FIGS. 1–3 and 5–7, the cartridge 12 is received in the cartridge receptacle 18 housed in the printer housing 2. The printer housing 2 is, preferably, formed from at least two portions 50, 52, and houses printer components, such as the cartridge receptacle 18, the keyboard 4, display 6, the cutter mechanism 26, a printed circuit board 54 having printer circuitry, and the like. The opening 8 formed in the housing top portion 50 provides access to the cartridge receptacle 18 for insertion of the cartridge 12 into the cartridge receptacle 18. A slot 56 formed in the housing 2 adjacent the cutter mechanism 26 provides an exit for label media 14 which has passed through the cutter mechanism 26.

The cartridge receptacle 18 has a periphery wall 58 generally shaped to conform with the cartridge periphery wall 34, and a bottom wall 60 that supports the cartridge 12 therein. The cartridge receptacle periphery wall 58 surrounds the printer mechanism assembly 20 which is fixed in the printer housing 2 relative to the cartridge receptacle 18.

The printer mechanism assembly 20 is fixed relative to the cartridge receptacle 18 in the printer housing 2, and includes the pivotable print head 22 and stationary platen roller 24. The print head 22 cooperates with the ink ribbon 16 and the label media 14 such that the print head 22 can print characters, symbols, and other indicia on the label media 14. This is described in greater detail in U.S. Pat. No. 5,078,523 which is incorporated herein by reference. The platen roller 24 also forms part of the drive mechanism.

The drive mechanism drives the label media 14 and ink ribbon 16 past the print head 22, and includes the platen roller drive shaft 62, label media drive shaft 92, ink ribbon rewind drive shaft 100, and ink ribbon unwind drive shaft 96. The drive mechanism selectively drives the rollers 24, 46 and spools 40, 48 to drive and tension the label media 14 and ink ribbon 16 in the forward and reverse feed directions. Preferably, the platen roller 24, label media drive roller 46, ink ribbon supply spool 48, and ink ribbon take up spool 40 are all rotatably driven by a dual feed direction drive mechanism mounted to the bottom of the cartridge receptacle 18, such as disclosed in a copending U.S. patent application Ser. No. 10/639,548. Although the drive mechanism disclosed in the copending patent application is preferred, any drive mechanism known in the art that can feed the label media and ink ribbon in one or more feed directions can be used without departing from the scope of the invention.

The label media 14 and ink ribbon 16 passing through the printing area 38 are advanced past the print head 22 in the forward feed direction and reverse feed direction by the platen roller 24 which maintains the ink ribbon 16 and label media 14 in close cooperation with the print head 22. The platen roller 24 is mounted on a platen roller drive shaft 62 which is rotatably mounted in the cartridge receptacle 18 by a bracket 66. The print head 22 is pivotally mounted relative to the platen roller 24 in the cartridge receptacle 18 to provide space between the print head 22 and platen roller 24 when As the label media 14 and ink ribbon 16 are driven in the forward and reverse feed directions by the platen roller 24, tension is maintained in the ink ribbon 16 and label media 14 by the label media drive shaft 92, ink ribbon rewind drive shaft 100, and ink ribbon unwind drive shaft 96. The label media drive shaft 92, ink ribbon rewind drive shaft 100, and ink ribbon unwind drive shaft 96 are each received through one of the drive shaft openings 86 formed in the cartridge housing bottom wall 32 and engage inner surfaces 94, 98, 102 of, and rotatably drive, the label media drive roller 46, ink ribbon supply spool 48, and ink ribbon take up spool 40, respectively.

Referring to FIGS. 1–7, in use, the cartridge 12 is inserted into the cartridge receptacle 18 with the label media drive shaft 92 received in the label media drive roller 46, the ink ribbon unwind drive shaft 96 received in the ink ribbon supply spool 48, and the ink ribbon rewind drive shaft 100 received in the ink ribbon take up spool 40. The shafts 92, 96, 100 properly position the cartridge 12 in the cartridge receptacle 18, and the label media 14 and ink ribbon 16 are threaded between the platen roller 24 and print head 22. The print head 22 is then urged toward the platen roller 24 to sandwich the label media 14 and ink ribbon 16 therebetween, and the cartridge 12 is locked in place.

Once the cartridge 12 is locked in place, the printer 10 is ready to produce wire markers. When printing on the tube, the label media 14 and ink ribbon 16 are fed past the platen roller 24 and print head 22 by the platen roller 24 in the forward feed direction by driving the platen roller 24 in a first direction of rotation. The ink ribbon take up spool 40 is rotatably driven in the first direction of rotation to take up the used ink ribbon 16 fed past the print head 22 and maintain tension in the ink ribbon 16. The label media drive roller 46 and ink ribbon supply spool 48 are not rotatably driven. Drag induced on the label media drive roller 46 and ink ribbon supply spool 48 by the cartridge 12 creates a tension in the label media 14 and ink ribbon 16 to prevent jams.

When a desired character is input by an operator or other means, the printer circuitry of the printer 10 energizes pixels on the print head 22 as the label media 14 and ink ribbon 16 advance past the print head 22. The head pixels are variously energized to imprint the character on the tube. This is described in greater detail in U.S. Pat. No. 5,078,523 which has been incorporated herein by reference.

When a label has been printed, the platen roller 24 continues to drive the label media 14 and ink ribbon 16 in the forward feed direction to advance the printed portion of the tube 17 past the cutter mechanism 26. Upon actuation of the cutter mechanism 26, the label media 14 including the tube 17 is cut, and the cut tube 17 is removed from the carrier web 15 to form the dynamically sized wire marker having a desired length. Once the label media is cut, the remaining label media 14 and ink ribbon 16 are fed in the reverse feed direction by the platen roller 24 to place the label media 14 in position for printing on the remaining tube 17 without wasting the label media 14 and ink ribbon 16.

The label media 14 and ink ribbon 16 are fed past the platen roller 24 and print head 22 in the reverse feed direction by driving the platen roller 24, label media drive roller 46, and ink ribbon supply spool 48 in a second direction of rotation. The platen roller 24 drives the label media 14 and ink ribbon 16 past the print head 22 while the ink ribbon 16 is wound onto the ink ribbon supply spool 48 and the label media 14 is urged onto the roll by the label media drive roller 46. The pixels on the print head 22, however, remain deenergized to avoid printing on the tube 17 as it is being repositioned for printing. The ink ribbon take up spool 40 is not rotatably driven, and drag induced on the ink ribbon take up spool 40 by the cartridge 12 creates a tension in the ink ribbon 16 to prevent jams.

While there has been shown and described what is at present considered the preferred embodiment of the invention, it will be obvious to those skilled in the art that various changes and modifications can be made therein without departing from the scope of the invention defined by the appended claims.

I claim:

1. Label media for use in a label media printer, said label media comprising:

a label media cartridge having a spool, and being insertable into the printer;

a carrier web having a length that is wound on the spool and shaped to be received by the printer and driven through a print station therein;

an adhesive disposed on one side of said carrier web; and a continuous tube disposed along the length of the carrier web and retained thereto by said adhesive, wherein said adhesive is a double coated tape.

2. The label media as in claim 1, in which said adhesive aggressively adheres to said carrier web and releasably adheres to said tube.

3. The label media as in claim 1, in which said tube is flattened on the carrier web.

4. The label media as in claim 1, in which said tube is formed from a heat shrink material.

5. Label media for use in a label media printer, said label media comprising:

a carrier web having a length;

an adhesive disposed on one side of said carrier web; and a continuous tube disposed along the length of the carrier web and retained thereto by said adhesive, wherein said adhesive is a double coated tape.

6. The label media as in claim 5, in which said adhesive aggressively adheres to said carrier web and releasably adheres to said tube.

7. The label media as in claim 5, in which said tube is formed from a heat shrink material.

8. The label media as in claim 5, in which said carrier web is wound into a roll.

9. The label media as in claim 8, in which said roll is supported on a spool, and forms part of a cartridge insertable into the printer.

10. The label media as in claim 5, in which said carrier web is shaped to be received by the printer and driven through a print station therein.

11. Label media for use in a label media printer, said label media comprising:

a carrier web having a length in the form of a roll;

a transfer adhesive disposed on one side of said carrier web; and a continuous, flattened tube disposed along the length of the carrier web and retained thereto by said adhesive, wherein said adhesive is a double coated tape.

12. The label media as in claim 11, in which said tube is formed from a heat shrink material.

13. The label media as in claim 11, in which said roll is supported on a spool, and forms part of a cartridge insertable into the printer.

14. The label media as in claim 11, in which said carrier web is shaped to be received by the printer and driven through a print station therein.

* * * * *

UNITED STATES PATENT AND TRADEMARK OFFICE

CERTIFICATE OF CORRECTION

PATENT NO. : 6,929,415 B2 
DATED : August 16, 2005
INVENTOR(S) : Wilken

It is certified that error appears in the above-identified patent and that said Letters Patent is hereby corrected as shown below:

<u>Column 5,</u>
Line 65, insert -- threading the label media 14 and ink ribbon 16 therebetween -- after "print head 22 and platen roller 24 when".

Signed and Sealed this

Eleventh Day of April, 2006

JON W. DUDAS
*Director of the United States Patent and Trademark Office*